US008688269B2

(12) United States Patent
Marx

(10) Patent No.: US 8,688,269 B2
(45) Date of Patent: Apr. 1, 2014

(54) APPARATUS FOR TEACHING A GRIPPING DEVICE

(75) Inventor: Christian Marx, Reutlingen (DE)

(73) Assignee: Walter Maschinenbau GmbH, Tübingen (DE)

( * ) Notice: Subject to any disclaimer, the term of this patent is extended or adjusted under 35 U.S.C. 154(b) by 299 days.

(21) Appl. No.: 13/136,406

(22) Filed: Jul. 29, 2011

(65) Prior Publication Data
US 2012/0027545 A1 Feb. 2, 2012

(30) Foreign Application Priority Data

Jul. 30, 2010 (DE) .................... 20 2010 008 191 U

(51) Int. Cl.
G06F 19/00 (2011.01)

(52) U.S. Cl.
USPC ............................................. 700/245; 901/3

(58) Field of Classification Search
USPC .......... 700/245, 251, 259, 254; 901/3, 14, 28, 901/30–32, 41, 42; 318/568.2, 568.17, 318/568.21, 568.22
See application file for complete search history.

(56) References Cited

U.S. PATENT DOCUMENTS

| 2,858,947 | A | * | 11/1958 | Chapman, Jr. | .................... | 414/5 |
| 3,168,698 | A | * | 2/1965 | Goody et al. | ................. | 324/127 |
| 4,613,943 | A | * | 9/1986 | Miyake et al. | ................ | 700/251 |
| 2005/0107920 | A1 | * | 5/2005 | Ban et al. | ...................... | 700/245 |

FOREIGN PATENT DOCUMENTS

DE    60 2004 013 107 T2    2/2009

* cited by examiner

Primary Examiner — Dalena Tran
(74) Attorney, Agent, or Firm — R. S. Lombard; K. Bach

(57) ABSTRACT

An apparatus for teaching a gripping device is disclosed. The gripping device includes an arm. The arm has a free end that can be freely moved in an operating region and includes a gripper. The gripper includes at least one, preferably two pairs of spaced apart gripping tongs consisting of an electrically conductive material. A control unit is included electrically connected to the tongs or a measuring body. A detecting means detects current in a control line. The apparatus uses a reference component having three reference surfaces to determine a reference coordinate system. By pre-specifying several points on the reference component that are to be approached, an automated determination of the position and alignment of a chuck or pallet can be utilized. A highly accurate analysis of a current signal is used by the apparatus for teaching the gripping device.

28 Claims, 6 Drawing Sheets

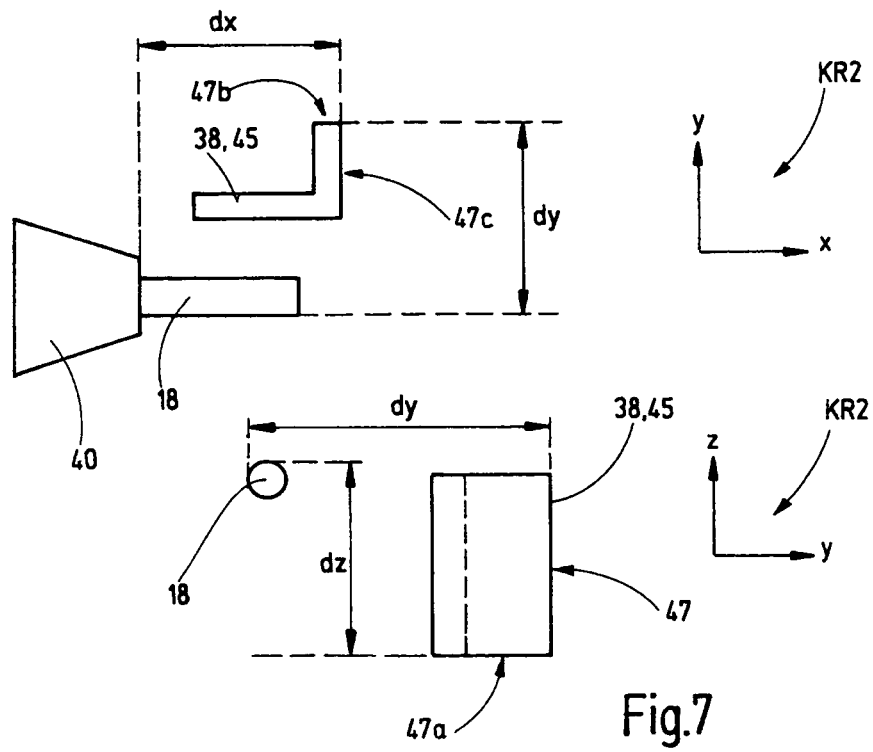
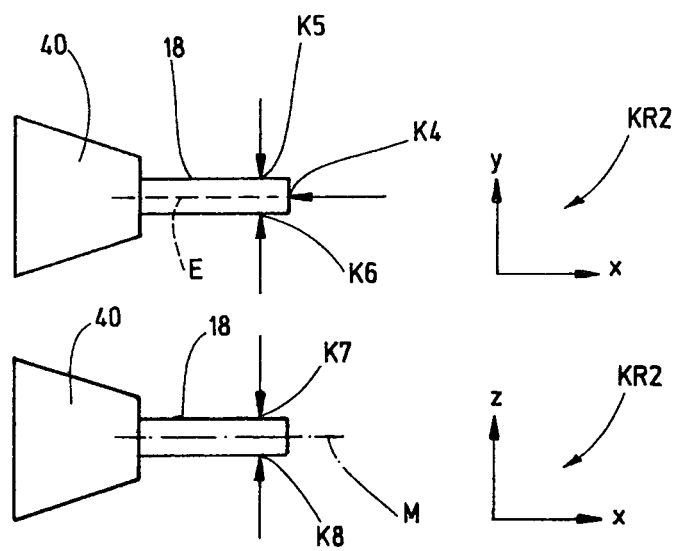

APPARATUS FOR TEACHING A GRIPPING DEVICE

CROSS-REFERENCE TO RELATED APPLICATION

This application claims the priority of German Application No. 20 2010 008 191.2 filed Jul. 30, 2010.

BACKGROUND OF THE INVENTION

The invention relates to an apparatus for teaching a gripping device. The gripping device is used for loading and unloading a clamping device, for example a chuck, of a machine tool and/or a pallet. For example, the gripping device may be used to remove blanks from one or more pallets and insert them into the chuck of a machine tool. The gripping device is also used to remove machined workpieces from the chuck and deposit them on a pallet. The gripping device must be taught in order to know the exact position of the blanks on the pallet or know the exact position of the chuck. Otherwise, blanks that have not been machined or workpieces that have been machined will not be grasped in a precise manner.

For example, it has been known from publication DE 60 2004 013 107 T2 to accomplish teaching by touching three or more reference points on the workpiece or on a holding device. A tool tip of the robot is brought in exact alignment with reference points of the workpiece or the holding device, and the three-dimensional positions of each reference point are measured. Known motion sequences of robots can then be applied to newly trained or learned positions. Such mechanical touching is very expensive.

In order to minimize the expense during the teaching phase and to increase the teaching accuracy of the device publication DE 60 2004 013 107 T2 further suggests that image sensors be used and that the three-dimensional position be computed based on the image detected by the image sensor. To accomplish this, for example, CCD cameras can be used.

SUMMARY OF THE INVENTION

This object is achieved with an apparatus in accordance with Claim 1. The apparatus comprises a gripping device with an arm that preferably has multiple members. The gripping arm is fixed in place by a mounting end and has a free end that can be freely moved in particular in an operating region in the space and bears a gripper. Preferably, the gripper comprises two separate, spaced apart pairs of gripping tongs. At least the gripping tongs of the gripper consist of electrically conductive material, in particular metal. The gripping arm has an insulating part that electrically insulates the mounting end with respect to the gripping tongs. Via a control line, a control unit is electrically connected with the gripping tongs and can apply a direct voltage to the gripping tongs or to an electrically conductive measuring body held by the gripping tongs. If one of the gripping tongs of the gripper or the measuring body comes into contact with an electrically conductive, grounded component, current flows through the control line. The apparatus comprises a detecting means for detecting this current in the control line. A grounded, electrically conductive reference component having three reference surfaces aligned at right angles to each other so that a reference coordinate system can be determined by touching the reference surfaces. The touching of reference surfaces with the gripping tongs or the measuring body enables a highly accurate determination of the position. By pre-specifying several points on the reference component that are to be approached, a largely automated determination of the position and alignment of the chuck and/or the pallet can be achieved.

A highly accurate analysis of the current signal in the control line is possible. Preferably, the control unit comprises an analyzing means that is adapted to recognize the descending flank of the current signal that is generated by the detecting means. The descending flank of the current signal is generated by the detecting means if the current flowing—due to the contact—between the gripping tongs or the measuring body and the reference component is again interrupted when the gripper or the measuring body is removed from the reference component. The descending flank is generated in exactly the moment in which there is no longer any electrical contact between the gripping tongs or the measuring body and the reference component. In this moment, there are no pressing forces acting between the gripping arm and the reference component so that no elastic deformations occur on the gripping arm and/or on the reference component, thereby enabling a highly accurate determination of the position.

The gripping arm may comprise several adjustment axes or adjustment drives, these being embodied as rotary drives, pivot drives or linear drives. In a preferred embodiment, the gripping arm comprises at least three and, in particular, five or six adjustment drives. In one exemplary embodiment, the position of each adjustment drive may be detected via a respectively associate position sensor.

In a preferred embodiment, the analyzing means is disposed to generate a memory signal when a descending flank of the current signal is detected. The memory signal causes the control unit to store the actual position of the gripper or the measuring body based on the position signals of the position sensors.

Preferably, a non-volatile memory is allocated to the control unit so that data are can be read into and read out of the memory. Furthermore, the control unit may be connected with an input means by means of which data can be transmitted to the control unit. Via the input means, it is possible to input reference points on the reference component and to store these in the memory. Furthermore, the control unit may be disposed to activate the adjustment drive of the gripping device in order to automatically touch the pre-specified reference points with the gripping tongs or the measuring body. In the same way, it is possible to pre-specify calibrating points on the reference component and/or on a grounded, electrically conductive blank that is mounted in the chuck device. Then, the control unit is adapted to activate the adjustment drive of the gripping device so that the calibrating points are automatically touched. Considering a preferred exemplary embodiment, the control unit is disposed to read in the stored positions of the reference points and/or the calibrating points and to determine therefrom the position of a reference coordinate system defined by the reference surfaces or the exact position of the reference component in the gripping arm coordinate system. Preferably, the control unit is designed to determine one reference coordinate system for each reference component that is being used.

In another advantageous embodiment, the control unit is designed to read in pre-specified reference values such as dimensions of the reference component and/or distances of the reference surfaces relative to a reference point outside the reference component and to compare said reference values with the values of the reference component and/or the determined distances relative to the reference point, said values being determined by approaching the calibrating points, and to determine—based on the result of the comparison—correction values for the adjustment movement of the gripping tongs, said adjustment movement having been determined with the position data of the position sensors. Therefore, sensor-related measuring errors and the resultant positioning errors of the gripper can be avoided or at least partially compensated for. A correction value can be separately determined for each coordinate direction, whereby, preferably, one correction value is determined for at least two coordinate directions.

BRIEF DESCRIPTION OF THE DRAWINGS

For a better understanding of the invention reference may be had to the accompanying drawings exemplary of the invention in which:

FIG. 7 a schematic representation, resembling a block circuit diagram, of a reference component acting as a bracket, as well as of the chuck device and reference values that are to be pre-specified; and FIG. 8 a schematic view of a blank with touched calibrating points of a blank clamped in the chuck device of a machine tool.

DETAILED DESCRIPTION OF VARIOUS EMBODIMENTS

Figure 1:
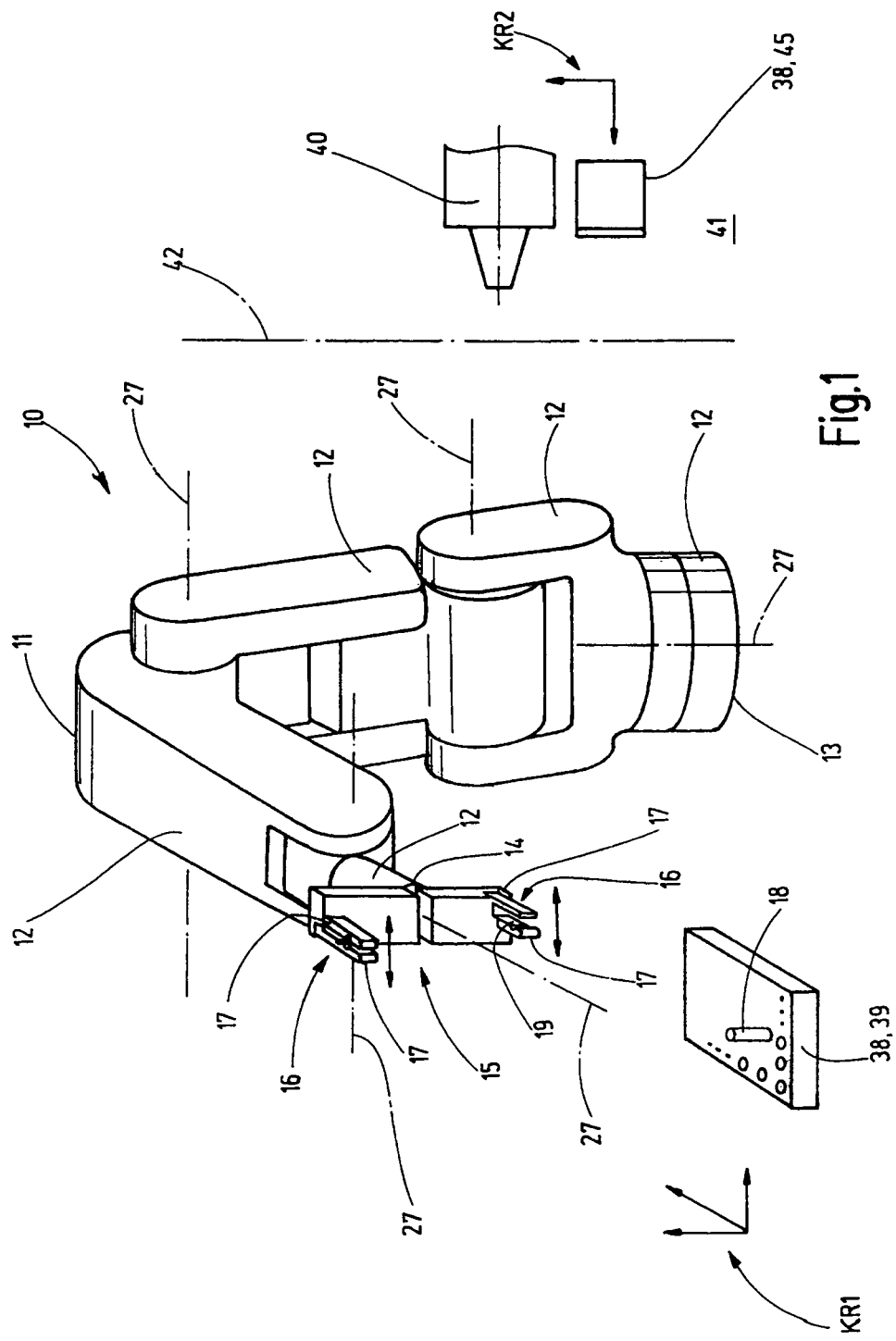
FIG. 1 a perspective representation of a gripping arm with a pallet, as well as a schematically illustrated chuck device of a machine tool.
Figure 2:
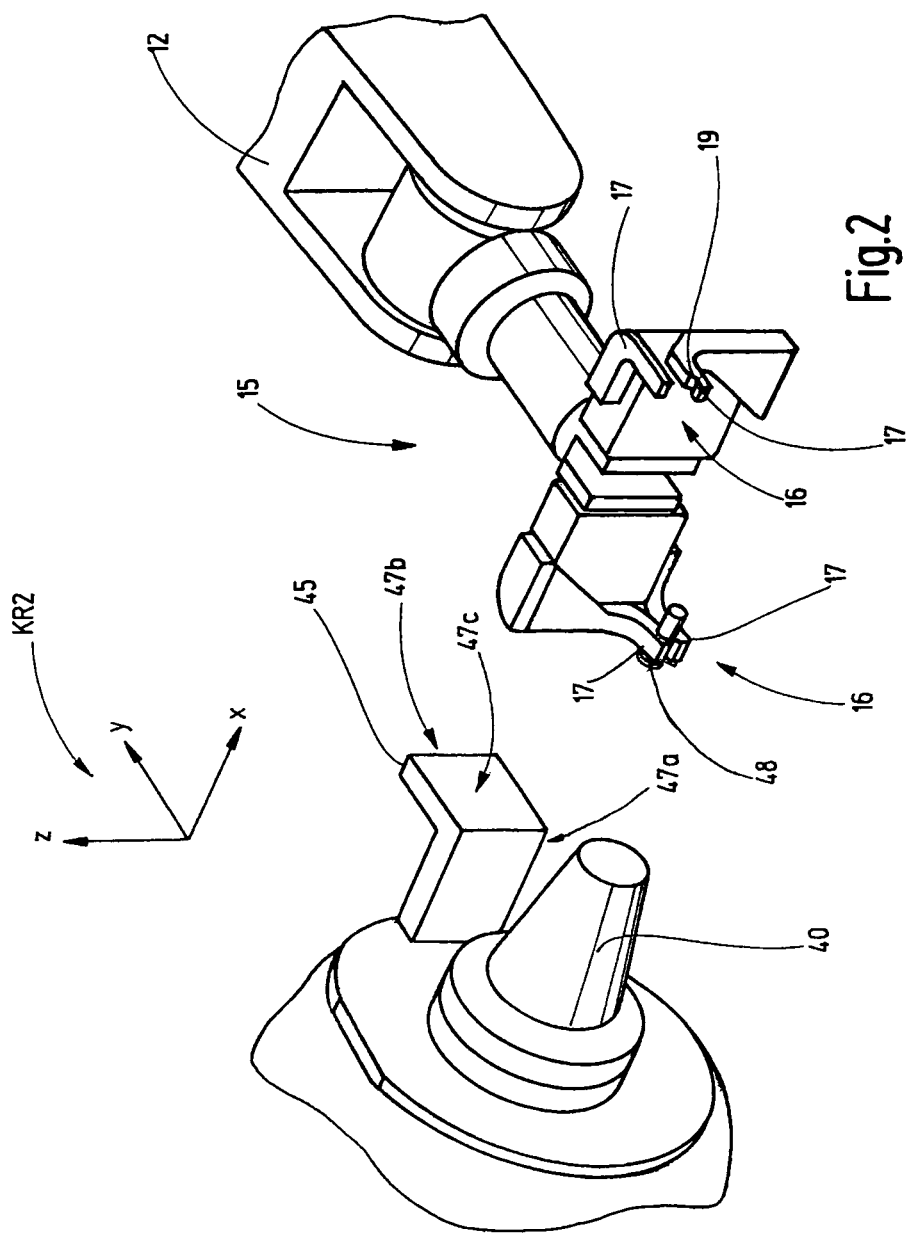
FIG. 2 the chuck device, a reference component, as well as the gripper of the gripping arm in accordance with FIG. 1, in a perspective partial illustration.

FIGS. 1 and 2 show an exemplary embodiment of a gripping device 10 with a gripping arm 11. The gripping arm 11 comprises several members 12 that are rotatably or pivotally connected with each other. The mounting end 13 of the gripping arm 11 is affixed to a mounting surface. On its free end 14 opposite its mounting end 14, the gripping arm 11 bears a gripper 15. The gripper 15 comprises at least one or, as in the example, two gripping tongs 16 that can be actuated independently of each other. Each pair of gripping tongs has two tong legs 17 that can be moved relative to each other, whereby a blank 18 or a machined workpiece can be clamped and held between said tong legs. In the exemplary embodiment, in particular cylindrical parts are to be held by the gripping tongs 16. Therefore, one of the tong legs 17 has a prism-shaped recess 19 in order to ensure that the cylindrical part is held securely.

The gripping device 10 comprises several adjustment drives 26 that can by activated by a control unit 25. Considering the exemplary embodiment described here, five adjustment drives 26 are provided, said adjustment drives being able to rotate the members 12 of the gripping arm 11 along one rotational axis or pivoting axis 27. In this manner, the gripper 15 can freely move in an operating region of the gripping device 10. The adjustment drives 26 are driven by a respectively allocated activation signal A1 through A5. Also, the actuation of the two gripping tongs 16 is accomplished by appropriate activation signals of the control unit 25.

A position sensor 28 is allocated to each adjustment drive 26, said position sensor delivering a corresponding position signal to the control unit 25. With the use of the position signals P1 through P5, the control unit 25 can determine the position of the gripper in the operating region of the gripping device 10.

The gripper 15 consists of electrically conductive material, for example metal. It is electrically connected with a control line 29, by way of which the gripper 15 can be connected to a direct-current voltage source 30, so that the control line 29 and the gripper 17 are subject to the same direct-voltage potential U. The gripper 17 is electrically insulated relative to its mounting end 13 by means of an insulating part 31. The insulating part 31 may be used at any point of the gripping arm 11. For example, the insulating part 31 may be an integral part of the pivot bearing connection between two members 12 of the gripping arm 11, as is shown only schematically in FIG. 3.

A detecting means 32 is disposed to detect a direct current I flowing through the control line 29. As a function of the direct current I, the detecting means 32 generates a current signal SI that is transmitted to the analyzing means 33 of the control unit 25. The application of the direct voltage U to the gripper 15 or the removal of said voltage from said gripper is accomplished by the control unit 25, as is being shown only symbolically by the switch 34 activated by the control unit 25 in FIG. 3. The controlled switch 34 may also be configured as a transistor and be an integral part of the control unit 25.

Also connected with the control unit 25 is an input means 35 by way of which data and reference values R can be transmitted to the control unit 25. In the exemplary embodiment, a combined input and output means 35 is to be used, so that data from the control unit can also be forwarded to the input and output means 35 for information of an operator.

Furthermore, a memory 36 is connected with the control unit 25. Data can be stored in, or read out of, the memory 36 by the control unit 25.

Figure 3:
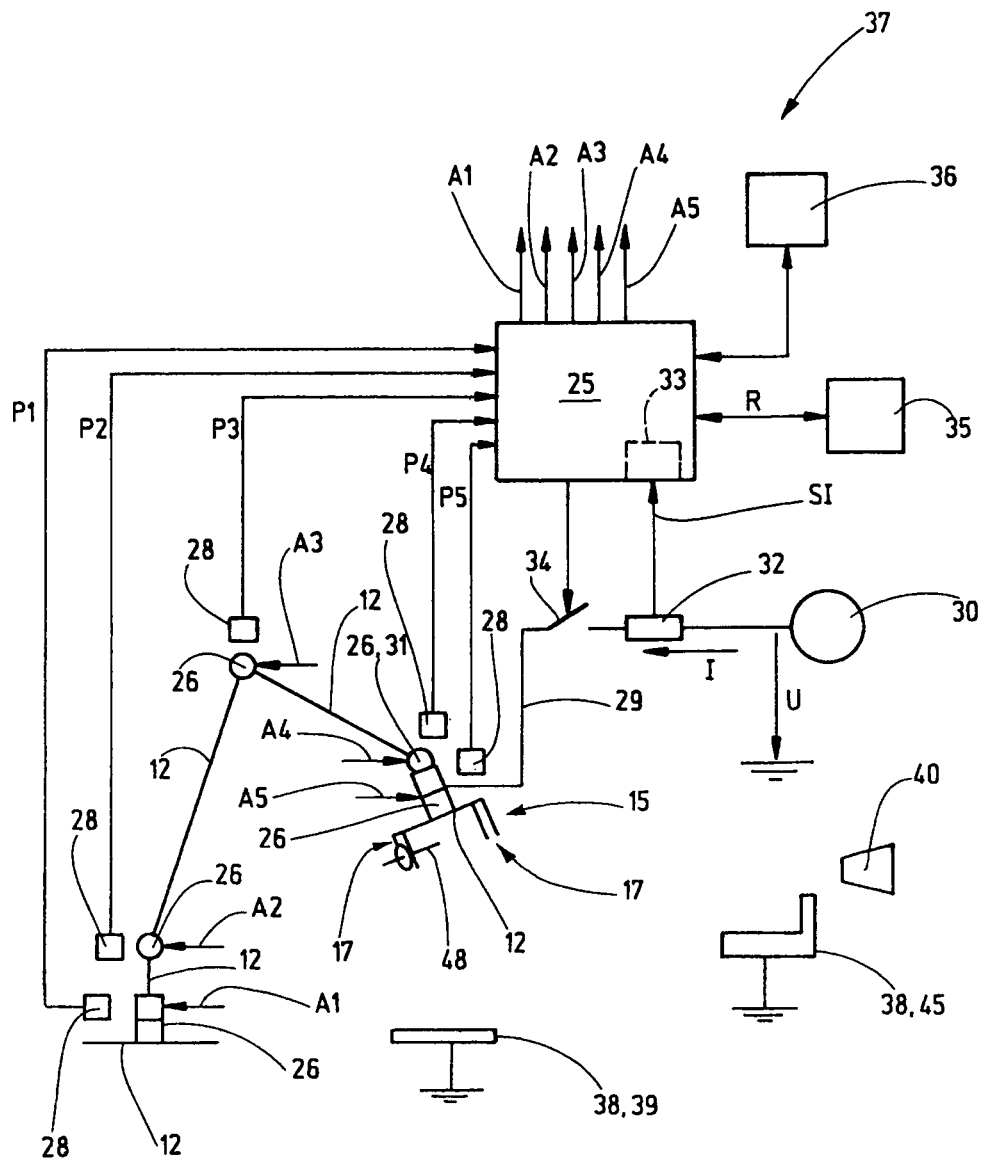
FIG. 3 a block circuit diagram of the apparatus for teaching the gripping device.
Figure 4:
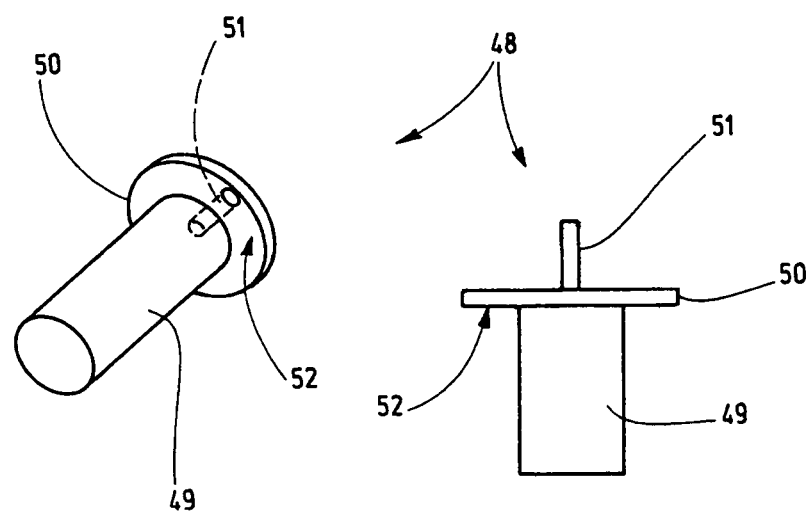
FIG. 4 a perspective illustration, as well as a side view, depicting an exemplary embodiment of the measuring body.

The apparatus 37 for teaching the gripping device 10 shown in the block circuit diagram according to FIG. 3 additionally comprises at least one and, as in the example, two reference components 38. The reference components 38 are electrically conductive and are grounded. The first reference component 38 is a pallet 39 that has the contour of a parallelepiped in the preferred exemplary embodiment. On the upper side of the pallet 39, a plurality of holes and pocket holes are provided in rows and columns, in which blanks 18 of machined workpieces can be inserted and be stored in this manner. The pallet 39 is arranged so as to be immovable relative to the fixed mounting end 13 of the gripping arm 11. It is understood that it is also possible to use several pallets 39 instead of one pallet 39.

Furthermore, a clamping device and, for example, a chuck 40 of a not specifically illustrated machine tool is immovably arranged opposite the mounting end 13 of the gripping arm 11 in the three-dimensional operating region of the gripping device 10. The chuck 40 is located in a machining region 41 of the machine tool, whereby said machining region can be closed off relative to the gripping device 10 by means of a dividing wall 42. The dividing wall 42 has an opening that can be closed and through which the gripping arm 11 with the gripper 15 can extend and reach the chuck 40. The pallet is arranged outside the machining region 41 of the machine tool. The dividing wall 42 is closed while the blank 18 is being machined by the machine tool.

Furthermore, the apparatus 37 for teaching the gripping device 10 comprises a bracket 45 that represents a second reference component 38. The bracket 45 can be mounted in a defined position relative to the chuck 40 or to a not specifically illustrated machine tool, so that said bracket is grounded through the machine tool. For example, the bracket 45 can be detachably mounted—via magnets, screws or other friction-locking or form-locking holding means—to the chuck 40 or to the machine tool.

The reference components 38 have a first reference surface 47a, a second reference surface 47b, as well as a third reference surface 47c, respectively, said surfaces being oriented at right angles to each other. For each reference component 38, these reference surfaces 47a, 47b, 47c define a reference coordinate system KR1, KR2 that is described, for example, by the Cartesian coordinate axes x, y, z. In the preferred exemplary embodiment, several pallets 39 may be provided, one of said pallets acting as the reference component 38 for defining the first reference coordinate system KR1 for the pallets. The bracket 45 acts as the reference component 38 for defining the reference coordinate system KR2 for the chuck device 40.

Furthermore, the apparatus 37 comprises a measuring body 48 that consists of electrically conductive material, for example metal. The measuring body 48 has a cylindrical holding section 49 that can be gripped by the gripping tongs 16 of the gripper 15. A flange 50 is provided at one end of the holding section 49, said flange radially projecting from the holding section 49. On the other side of the flange 50, coaxially with respect to the holding section 49, there is a touch tip 51 that is cylindrical, in accordance with the example. The diameter of the touch tip 51 is smaller than that of the holding section 49. The peripheral annular surface 52 circumscribing the holding section 49 on the flange 50 acts as the abutment surface for placing the measuring body in one of the gripping tongs 16, so that the touch tip 51 assumes a defined position relative to the gripping tongs 16. When the measuring body 48 is grasped, an electrical connection is established between the touch tip 51 and the control line 29. The shape of the measuring body 48 is not restricted to a preferred embodiment. A measuring body 48 in the form of a measuring pin with a touch tip 51 has been found to be advantageous for accurate touching.

In the manufacture of workpieces, the gripping device 10 is disposed to remove blanks 18 from the pallet 39 and deliver them to the chuck 40. Finished, machined workpieces are removed from the chuck 40 and deposited on a pallet 39. The gripping device 10 in accordance with the invention comprises two gripping tongs 16 to be able to pick up a blank, to subsequently move to the chuck 40, and to initially deposit there the finished, machined workpiece with the still free gripping tongs 16, and to subsequently place the blank in the chuck 40 by performing only a small positioning motion. Thereafter, the gripping arm 11 moves back to the pallet 39, deposits there the finished, machined workpiece, and removes a new blank 18 with the other gripping tongs 16. Then the process is repeated.

In doing so, one of the gripping tongs 16 is intended for removing the blanks 18 from the pallet(s) 39 and loading the chuck device 40, whereas the other gripping tongs 16 are intended for unloading the chuck device 40 and for depositing the machined workpiece on the pallet 39. If one of the pallets 39 is only disposed for making blanks available, it is only the gripping tongs 16 intended for the removal of blanks 18 from the pallet 39 that must be taught. Analogously, the same applies if a pallet 39 is only intended for the accommodation of machined workpieces.

After setting up the gripping device 10 on the machine tool, the gripping device 10 must be taught. To accomplish this, the apparatus 37 is provided. It is adapted to efficiently and accurately teach the gripping device 10 for both gripping tongs 16 of the gripper 15.

Reference values R are input via the input and output means 35. The control unit 25 can read in these reference values R and store them in the memory 36. In the exemplary embodiment, the following data are used as the reference values R:

the dimensions of the pallet 39 acting as the reference component 38 in x, y and z directions;

the distance values dx, dy, dz between the reference surfaces 47a, 47b, 47c of the bracket 45 and a point on the generated surface of the blank 18 mounted in the chuck 40; and the diameter of the blank.

Based on these reference values R, teaching by the apparatus 37 is almost fully autonomous. First, the measuring body 48 is picked up by the gripping tongs 16 that are to be taught. The distance between the abutment surface 52 and the free end of the touch tip 51 of the touch pin is also stored in the memory 26. First, the gripping arm moves the touch tip 51 of the measuring body 48 to the pallet 39 acting as the reference component 38 at a first reference point R1 on the upper side of the pallet 39, said pallet acting as the first reference surface 47a. The control unit 25 drives the adjustment drives 26 until the measuring tip 51 abuts against the first reference point R1 and a current I is detected by the detecting means 32. The control unit 25 is adapted to deactivate the adjustment drives 26 as soon as the analyzing means 33 has detected an ascending flank in the current signal SI. The control unit 25 then operates the adjustment drives 26 in opposite direction in order to again remove the touch tip 51 from the pallet 39. As soon as there is no longer any contact between the touch tip 51 and the pallet 39, the analyzing means 33 recognizes a descending flank of the current signal SI of the detecting means 32. The analyzing means 33 then generates a memory signal. The control unit 25 is adapted to determine the actual position of the measuring body 48 or the touch tip 51 based on the position signals P1 through P5 and to store the resultant actual position in memory when there is a memory signal.

Figure 5:
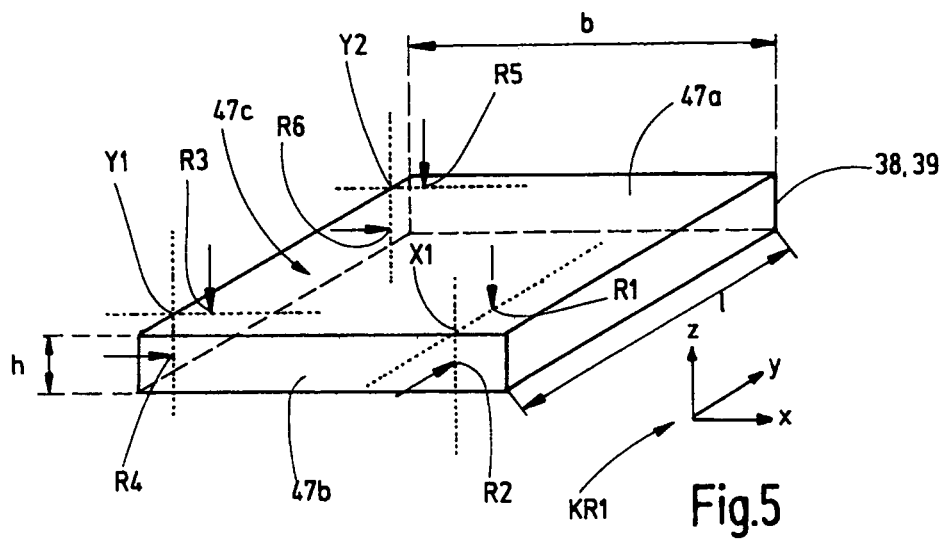
FIG. 5 a schematic perspective illustration of a pallet acting as the reference component, as well as the reference points on the pallet that are being touched.
Figure 6:
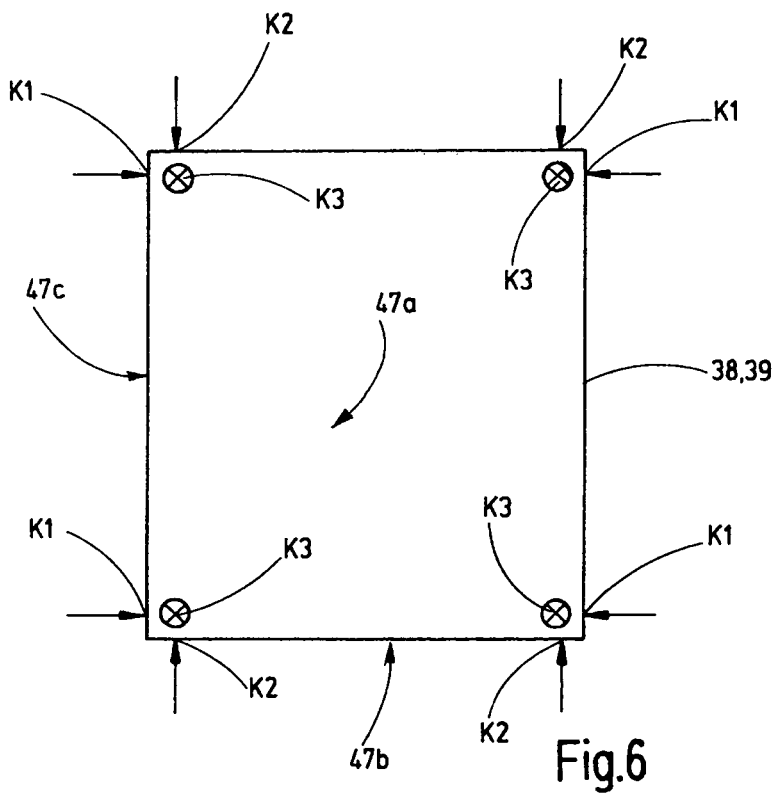
FIG. 6 a schematic plan view of the pallet in accordance with FIG. 5 with the calibrating points that are being touched.

Subsequently, the touch tip 51 is moved to a second reference point R2 on the second reference surface 47b. The first and second reference points R1, R2 are on a common plane that is orientated transversely with respect to the first and second reference surfaces 47a, 47c, however need not be oriented parallel with respect to the third reference surface as is shown by the dotted lines in FIG. 5. In the exemplary embodiment, the two reference points R1, R2 are located approximately on a common y-z-plane. Inasmuch as it is known that the first reference point R1 and the second reference point R2 are located on reference surfaces 47, i.e., 47a, 47b that are at a right angles to each other, the control unit 25 can detect a first point X1 on the edge of the pallet between the two reference surfaces 47a, 47b. This first point defines the shortest distance along the reference surfaces 47a, 47b between the two reference points R1, R2.

In principle, the same process takes place on the reference component 38 at a total of three points. Therefore, subsequently, a third reference point R3 on the first reference surface 47a as well as a fourth reference point R4 on the third reference surface 47c are touched. Inasmuch as the process is analogous, a second point Y1 on the edge of the pallet 39 between the first reference surface 47a and the third reference surface 47c is obtained. On this edge, at a distance from the second point Y1, a third point Y2 is determined by touching a fifth reference point R5 on the first reference surface 47a and a sixth reference point R6 on the third reference surface 47c.

The second point Y1 and the third point Y2 then define the contour of the edge on which both points are located. This edge defines the progression of the y-axis of the first reference coordinate system KR1 for the pallet 39. Inasmuch as the edge on which the first point X1 is located extends at a right angle to the y-axis, this edge defines the x-axis of the reference coordinate system KR1 and can be determined without any additional measurement. The progression of the z-axis then will also be obvious. Consequently, the first reference coordinate system KR1 of the pallet 39 is fixed. Preferably, this applies to each pallet 39 when there are several pallets 39. Alternatively, a separate reference coordinate system could be determined for each pallet, provided the outside surfaces of said pallet have different orientations.

After determining the first reference coordinate system KR1, the gripping tongs 16 are separately calibrated for each pallet 39. Then, the control unit 25 controls the adjustment drives 26 of the gripping arm 11 in such a manner that all the corners of the pallet 39 are automatically measured in sequence. To do so, at least two calibrating points K1, K2 in the x-z plane as well as in the y-z-plane are approached in each corner region. Optionally, it is also possible to approach an additional calibrating point K3 in the x-y-plane on the upper side of the pallet 39. The exact z-position of the upper side of the pallet, however, is less important for picking the blank 18 off the pallet 39 or the depositing of the machined workpieces, so that the exact determination of the position of the corners on the x-y-plane is sufficient. Inasmuch as the position of the holes in the pallet 39 relative to the corners is known, the control unit 25 is able to compute the exact position for depositing and for picking up blanks 18 and workpieces during the subsequent process step. Regarding this, it would be sufficient—in principle—to exactly determine the position of one of the corners because the dimensions of the pallet 39 are known. However, in a preferred exemplary embodiment, the determination of all the corner positions is additionally used for the determination of the correction values px, py.

The actual length l, width b and, optionally, also the height h of the pallet 39 are pre-specified. Based on the determined positions of the corners of the pallet 39, it is possible to calculate the length l* and the width b* and—if the z-position of the corner was also determined—also the height h* of the pallet 39. These calculated dimensions l*, b*, h* are subsequently compared by the control unit 25 with the actual dimensions l, b, h that have been prespecified as reference values R. Based on the comparison, the correction values px and py result at least for the two coordinate directions x, y. In the simplest case, the factors can be defined as follows:

$px=b/b^*$ and $py=l/l^*$ and, optionally $pz=h/h^*$.

Sensor errors of the position sensors 28 when the gripping tongs 16 are being positioned can at least be partially compensated for by using the correction values px, py, pz. The actual position of the gripping tongs 16 in the respective coordinate directions x, y, z corresponds to the positions x*, y*, z* determined with the use of the signals P1 through P5, multiplied with the respectively allocated correction value px, py, pz. Consequently, by moving the gripping arm 11, exact positioning is made possible. The sensor errors are at least partially compensated for. These correction values px, py, pz apply to any positioning of the gripping tongs 16 in the region of the pallet. Other correction values may be determined for other parts of the three-dimensional operating region.

Also, the correction values px, py pz may be a function of parameters. Parameters that can be considered are, for example, the adjustment speed of the gripping tongs 16 and/or the acceleration of the gripping tongs 16 and/or the temperature and/or other influencing variables.

By moving up to the reference values R1 through R6 on the three reference surfaces 47a, 47b, 47c of the bracket 45, it is also possible to determine the length of the second reference coordinate system KR2, said reference coordinate system being pre-specified by the bracket 45. This second reference coordinate system KR2 may deviate from the reference coordinate system KR1, said coordinate reference system being defined by the pallet 39. In practical applications, this will be the rule. However, the process of determining the second reference coordinate system KR2 is the same, said process having been described in conjunction with FIG. 5 and the first reference component 38 represented by the pallet 39. To this extent, reference is made to the description.

After the second reference coordinate system KR2 of the bracket 45 has been determined, the control unit 25 imitates touching of the calibrating points K4 through K8 on a blank mounted in the chuck 40. By approaching these calibrating points K4 through K8 the center longitudinal axis M of the mounted blank 18, as well as the position of the free end of the mounted blank 18, are determined. To do so, a fourth calibrating point K4 is first touched, said calibrating point representing the free end of the mounted blank 18 in the x-z-plane of the second reference coordinate system KR2. Subsequently, the mounted blank 18 is touched in radial direction at a fifth calibrating point K5 on the generated surface and, in circumferential direction at a distance therefrom, at a sixth calibrating point K6. These two calibrating points K5, K6 need not be located diametrically opposite each other. By determining the position of the two calibrating points K5, K6, the plane E results, said plane including the center longitudinal axis M of the blank 18. Subsequently, the blank 18 is touched at seventh and eighth calibrating points K7, K8 that are different from the fifth and sixth calibrating points K5, K6. For example, the seventh and the eighth calibrating points K7, K8 may be located on plane E. However, this is not absolutely necessary. The four calibrating points K5 through K8 on the generated surface of the blank 18 can then be used to calculate the center longitudinal axis M.

The position and orientation of the center longitudinal axis M of the mounted blank 18 can be determined. In the exemplary embodiment, based on the positions of the reference points R1 through R6 at the bracket 45, as well as the calibrating points K4 through K8 on the mounted blank 18, the distance values dx*, dy*, dz* of the generated surface of the blank 18 relative to each of the three reference surfaces 47a, 47b, 47c are determined and compared with the pre-specified actual distance values dx, dy, dz. As previously described in conjunction with the pallet 39, it is also possible to determine correction values sx, sy, sz for the chuck 40:

$sx=dx/dx^*$ $sy=dy/dy^*$ $sz=dz/dz^*$

The calibration by moving against the calibrating points K1 through K8 on the two reference components 38 is separately performed for each gripping tongs 16. The coordinate axes of the two reference coordinate systems KR1, KR2 are preferably determined simply by touching the reference components 38 once with one of the two gripping tongs 16 or the measuring body 48 held by said tongs. The correction values px, py, pz and sx, sy, sz are separately determined for each of the two gripping tongs 16 of the gripper 15 and may be different.

The determination and storage of the positions of the reference points R1 through R6, as well as the calibrating points K1 through K8 occurs in the moment in which the analyzing means 33 detects a descending flank of the current signal SI. At this time, there is no longer any contact between the touch tip 51 of the measuring body 48 and the associate reference surface 47 on the reference component 38, so that no elastic deformations and measuring errors caused thereby will occur.

The apparatus 37 and, in particular, the control unit 25 of the apparatus 37 are disposed to perform the above-described process. Any necessary hardware and software means are provided.

LIST OF REFERENCE SIGNS

10 Gripping device
11 Gripping arm
12 Member of 11
13 Mounting end of 11
14 Free end of 11
15 Gripper
16 Gripping tongs
17 Tongs leg
18 Blank
19 Prism-shaped recess
25 Control unit
26 Adjustment drive
27 Rotational axis
28 Position sensor
29 Control line
30 Direct voltage source
31 Insulating part
32 Detecting means
33 Analyzing means
34 Controlled switch
35 Input and output means
36 Memory
37 Device for teaching
38 Reference component
39 Pallet
40 Chuck
41 Machining region
42 Dividing wall
45 Bracket
47a First reference surface
47b Second reference surface
47c Third reference surface
48 Measuring body
49 Holding section
50 Flange
51 Touch tip
52 Abutment surface
A1-A5 Actuation signal
I Direct current
KR1 First reference coordinate system
KR2 Second reference coordinate system
K1-K8 Calibrating point
M Center longitudinal axis
P1-P5 Position signal
R Reference values
R1-R8 Reference point
SI Current signal
U Direct voltage
X1 First point
Y1 Second point
Y2 Third point

What is claimed is:

1. Apparatus for teaching a gripping device (10) for loading and unloading a chuck device (40) of a machine tool and/or a pallet (39), comprising: a gripping arm (11) fixed in place by a mounting end (13) and having a free end (13) that can be freely moved in an operating region and bears a gripper (15) with at least one pair of electrically conductive gripping tongs (16), an insulating part (31) that electrically insulates the gripping tongs (16) with respect to the mounting end (13), a control unit (25) that is electrically connected, via a control line (29), with the at least one pair of gripping tongs (16) and can apply, via the control unit (25), a direct voltage (U) to the at least one pair of gripping tongs (16) or to an electrically conductive measuring body (48) held by the at least one pair of gripping tongs (16), a grounded, electrically conductive reference component (38) that has at least two reference surfaces (47) aligned at right angles to each other, a detecting arrangement (32) for detecting a current (I) in the control line (29) when the at least one pair of gripping tongs (16) or the measuring body (48) comes into contact with the reference component (38).

2. Apparatus as in claim 1, characterized by a first reference component (38) is a pallet (39) for storing non-machined blanks (18) to be machined and/or machined workpieces.

3. Apparatus as in claim 1, characterized by a second reference component (38) is a bracket (45) that comprises a mounting arrangement for mounting said bracket in a defined position relative to the chuck device (40) on the machine tool.

4. Apparatus as in claim 1, characterized by an input and output arrangement (35) is provided, connected in circuit with the control unit (25), the input and output arrangement (35) for transmitting data to the control unit (25).

5. Apparatus as in claim 1, characterized by the gripping device (10) comprises several adjustment drives (26), a position sensor (28) is operatively allocated to each adjustment drive (26).

6. Apparatus as in claim 5, characterized by the detecting arrangement (32) is for generating a current signal (SI) with a descending flank, the descending flank of the current signal (SI) for representing the current (I) has been interrupted which had been flowing between the at least one pair of gripping tongs (16) or the measuring body (48) and the reference component (38) when the contact between the at least one pair of gripping tongs (16) or the measuring body (48) and the reference component (38) is again interrupted.

7. Apparatus as in claim 6, characterized by the control unit (25) comprises an analyzing arrangement (33) for recognizing the descending flank of the current signal (SI).

8. Apparatus as in claim 7, characterized by further including a memory (36) and a plurality of position sensors (28), each position sensor (28) for generating a position signal (P1-P5), the analyzing arrangement (33), when the descending flank of the current signal (SI) is recognized, for generating a memory signal for causing a storage in memory (36) of an actual position of the at least one pair of gripping tongs (16) or of the measuring body (48), the actual position of at least one pair of gripping tongs (16) or of the measuring body (48) having been determined based on a plurality of position signals (P1-P5).

9. Apparatus as in claim 8, characterized by the control unit (25) is disposed to activate the adjustment drives (26) of the gripping device (10) in order to automatically touch several pre-specified reference points (R1-R6) on the reference component (38) with the at least one pair of gripping tongs (16) or with the measuring body (48).

10. Apparatus as in claim 9, characterized by the control unit (25) is disposed to read in a plurality of stored positions of the reference points (R1-R6) and to determine therefrom a position of a reference coordinate system (KR1, KR2) defined by the reference surfaces (47).

11. Apparatus as in claim 10, characterized by the control unit (25) is disposed to determine one reference coordinate system (KR1, KR2), respectively, for several and, in particular, for each of the reference components (38, 39, 45) that are being used.

12. Apparatus as in claim 11, characterized by the control unit (25) is disposed to read in a plurality of stored positions of the calibrating points (K1-K3; K4-K8) and to determine therefrom an exact position of the reference component (38) and/or the blank (18) mounted in the chuck device (40).

13. Apparatus as in claim 11, characterized by the control unit (25) is disposed to read in the stored positions of the calibrating points (K1-K3; K4-K8) as well as a plurality of pre-specified reference values (R), and to compare the stored positions of the calibrating points (K1-K3; K4-K8) with the pre-specified reference values (R).

14. Apparatus as in claim 13, characterized by the control unit (25) is disposed to determine, based on the result of the comparison, at least one correction value (px, py, pz; sx, sy, sz) for determining a position of the gripper (15).

15. Apparatus as in claim 14, characterized by the control unit (25) is disposed to determine a correction value (px, py, pz; sx, sy, sz) that is allocated to one of a plurality of coordinate directions (x, y, z).

16. Apparatus as in claim 15, characterized by the control unit (25) is disposed to determine, for a first coordinate direction (x) and a second coordinate direction (y), respectively, a correction value (px, py; sx, sy).

17. Apparatus as in claim 14, characterized by the control unit (25) is disposed to determine, for different three-dimensional regions in the operating region of the gripping device (10), respectively, one or more correction values (px, py, pz; sx, sy, sz).

18. Apparatus as in claim 10, characterized by the gripper (15) comprises two pairs of gripping tongs (16).

19. Apparatus as in claim 18, characterized by the control unit (25) is disposed to separately teach the two pairs of gripping tongs (16).

20. Apparatus as in claim 19, characterized by the control unit (25) is disposed to use the reference coordinate system (KR1, KR2) determined when the first pair of gripping tongs (16) were being taught when said control unit is teaching the second pair of gripping tongs (16).

21. Apparatus as in claim 5, characterized by the control unit (25) is disposed to activate the adjustment drives (26) of the gripping device (10) in order to automatically touch, with the at least one pair of gripping tongs (16) or with the measuring device (48), several pre-specified calibrating points (K1-K3; K4-K8) on the reference component (38) and/or on a grounded, electrically conductive blank (18) mounted in the chuck device (40).

22. Apparatus as in claim 1, characterized by the control unit (25) is connected to a memory (36).

23. Memory (36) of an apparatus (37) for teaching a gripping device (10), the gripping device (10) includes a gripper (15) including at least one pair of electrically conductive gripping tongs (16), the memory (36) wherein data of a control program are stored, said data, when the control program is activated, prompting the apparatus (37) for performing the following actions:
- Apply a direct current voltage (U) to the at least one pair of electrically conductive gripping tongs (16) of the gripper (15) or to an electrically conductive measuring body (48) held by the at least one pair of gripping tongs (16);
- Generate a current signal (SI) setting the current flow (I) through the at least one pair of gripping tongs (16) or the measuring body (48);
- Touch several reference points (R1-R6) on a grounded, electrically conductive reference component (38) having at least two reference surfaces (47) at right angles to each other;
- Read in a plurality of position signals (P1-P5) of a plurality of position sensors of a gripping arm (11) bearing and moving the at least one pair of gripping tongs (16);
- Determine a position of the reference points (R1-R6);
- Determine a reference coordinate system (KR1, KR2) based on the detected positions of the reference points (R1-R6).

24. Memory as in claim 23, characterized by the stored data of the control program prompt the gripping device (10), when the control program is activated, to additionally perform the following actions:
- Touch several calibrating points (K1-K6) on the reference component (38) and/or on a grounded, electrically conductive blank (18) held in a chuck device (40), and
- Determine a position of the reference component (38) and/or of the blank (18) held in the chuck device (40).

25. Memory as in claim 24, characterized by the stored data of the control program prompt the gripping device (10), when the control program is activated, to additionally perform the following actions:
- Determine a dimension (l*, b*, h*) of the reference component (38) and/or a distance value (dx, dy, dz) of the reference component (38) from the blank (18) held in the chuck device (40),
- Compare the determined dimension (l*, b*, h*) of the reference component (38) and/or the determined distance value (dx*, dy*, dz*) with a plurality of pre-specified reference values (R; l, b, h; dx, dy, dz).

26. Memory as in claim 25, characterized by the stored data of the control program, when said control program is activated, prompt the gripping device (10) to additionally perform the following actions:
- Determine at least one correction value (px, py, pz; sx, sy, sz), based on the results of the comparison, for determining a position of the at least one pair of gripping tongs (16).

27. Memory as in claim 26, characterized by the stored data of the control program, when the control program is activated, prompt the gripping device (10) to additionally perform the following action:
- Determine one correction value (px, py, pz; sx, sy, sz), respectively, for at least two coordinate directions (x, y, z).

28. Memory as in claim 27, characterized by the gripper (15) includes two pairs of electrically conductive gripping tongs (16), stored data of the control program, when the control program is activated, prompt the gripping device (10) utilizing at least one of the aforesaid actions to additionally perform the following actions:
- Teach the first pair of gripping tongs (16) of the gripper (15), and Perform at least one of the aforesaid actions when teaching the second pair of gripping tongs (16) of the gripper (15).

\* \* \* \* \*